United States Patent [19]

Chen

[11] Patent Number: 4,928,956
[45] Date of Patent: May 29, 1990

[54] SPEED-ADJUSTING MECHANISM OF A TREAD MILL

[76] Inventor: Chao-Yang Chen, No. 585, San Feng Rd., Feng-Yuan City, Taiwan

[21] Appl. No.: 244,046

[22] Filed: Sep. 13, 1988

Related U.S. Application Data

[63] Continuation-in-part of Ser. No. 121,355, Nov. 16, 1987, Pat. No. 4,792,134.

[51] Int. Cl.⁵ .......................... A63B 23/06; F16H 9/12
[52] U.S. Cl. .......................................... 272/69; 474/27
[58] Field of Search ...................... 272/69, 97, DIG. 4; 474/24, 25, 26, 27, 89, 114, 115

[56] References Cited

U.S. PATENT DOCUMENTS

| | | | |
|---|---|---|---|
| 4,502,679 | 3/1985 | DeLorenzo | 272/69 |
| 4,729,558 | 3/1988 | Kuo | 272/69 |
| 4,792,134 | 12/1988 | Chen | 272/69 |

*Primary Examiner*—Stephen R. Crow
*Attorney, Agent, or Firm*—Lowe, Price, LeBlanc, Becker & Shur

[57] ABSTRACT

The present invention provides a speed adjusting transmission mechanism for adjusting the speed of a rotative belt of a tread mill which comprises an adjustment transmission shaft provided movably between an output shaft of a motor and a driven shaft associated with the rotative belt. The movable transmission shaft is held by a vertical plate which is mounted on a pair of vertical guide supports and which is slideable along vertical rail grooves of the guide supports. This support means is simple and durable. The mechanism further includes V-belt carrying pulleys respectively mounted on the output shaft, two opposite ends of the transmission shaft and one end of the driven shaft. The pulleys mounted on the output shaft and on one end of the transmission shaft each comprise two cone-shaped discs one of which is slideable. A reversible motor in combination with a screw drive means is also provided for moving the holder plate of the transmission shaft so that the speed of the motion transmitted by the V-belts can be adjusted.

5 Claims, 4 Drawing Sheets

SPEED-ADJUSTING MECHANISM OF A TREAD MILL

This invention is a continuation-in-part application of U.S. patent application No. 121,355 filed on Nov. 16, 1987, U.S. Pat. No. 4,792,134.

BACKGROUND OF THE INVENTION

This invention relates to a tread mill, particularly to an improved speed-adjusting mechanism for a tread mill which includes a V-belt drive transmission mechanism having a laterally movable transmission shaft to adjust the speed of the transmission.

The parent application of this application discloses a tread mill with a speed-adjusting mechanism and a slope-adjusting mechanism. The speed-adjusting mechanism includes two V-belt carrying pulleys, i.e., two pairs of cone-shaped discs mounted coaxially on a transmission shaft which is provided between an output shaft of a motor and a driven shaft associated with the tread belt. One of the pairs of the discs has a fixed disc and a slideable disc which is adjacent to the slideable disc of the other pair of discs, and the slideable discs slide mutually upon displacement of the transmission shaft. A V-belt is passed over one pair of the discs and a pulley mounted on the output shaft, and another V-belt is passed over the other pair of the discs and a pulley mounted on the shaft of the rotative tread belt. An arrangement for displacing the transmission shaft is provided for adjusting the transmission speed. This arrangement is rather complicated.

SUMMARY OF THE INVENTION

An object of the invention is to provide a speed-adjustable transmission mechanism for a tread mill which has a transmission shaft movably mounted on the tread mill by a durable and simple means for the purpose of convenient adjustment of the transmission speed.

The present invention provides a speed adjustable transmission mechanism for adjusting the rotative belt of a tread mill which comprises a movable adjustment transmission shaft provided between the output shaft of a motor and a driven shaft associated with the rotative belt. The movable transmission shaft is held by a vertical plate which is mounted on a pair of vertical guide supports and which is slideable along vertical rail grooves of the guide supports. This support means is simple and durable. The mechanism further includes a first pulley which is mounted on the output shaft and is constituted of two cone-shaped discs one of which is slideable, a second pulley mounted on a first end of the transmission shaft, a third pulley mounted on a second end of the transmission shaft and having two cone-shaped discs one of which is slideable, a fourth pulley mounted on the driven shaft, a first V-belt passing over the first pulley and the second pulley, and a second V-belt passing over the third pulley and the fourth pulley.

A reversible motor is also provided for moving the holder plate of the transmission shaft upward and downward so that the speed of the motion transmitted by the V-belts can be adjusted.

The exemplary preferred embodiment of the invention will be described in detail with reference to the accompanying drawings, in which:

DETAILED DESCRIPTION OF THE PREFERRED EMBODIMENT

Figure 1:
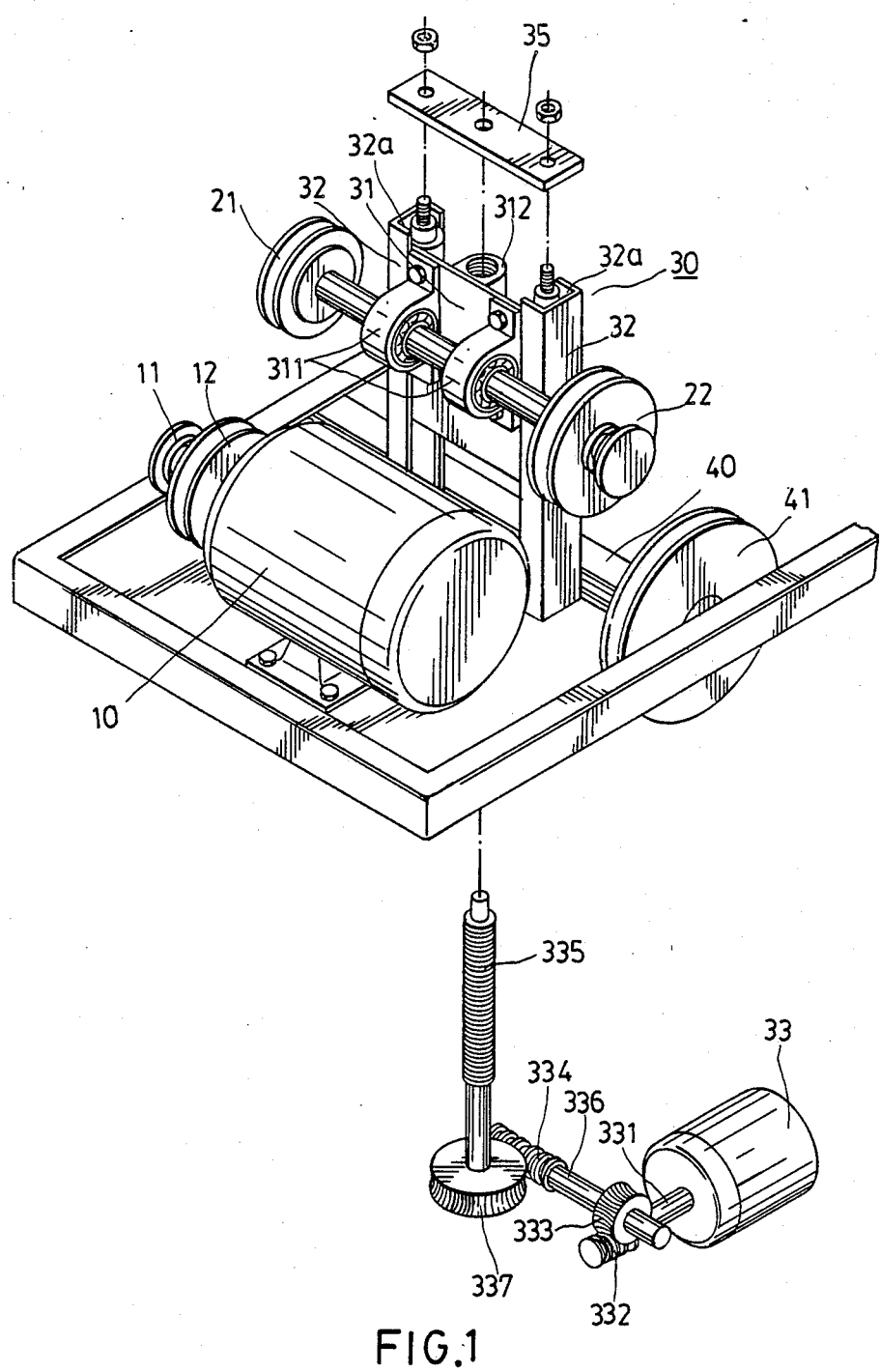
FIG. 1 is an exploded view of a first embodiment of the transmission mechanism according to the present invention.
Figure 2:
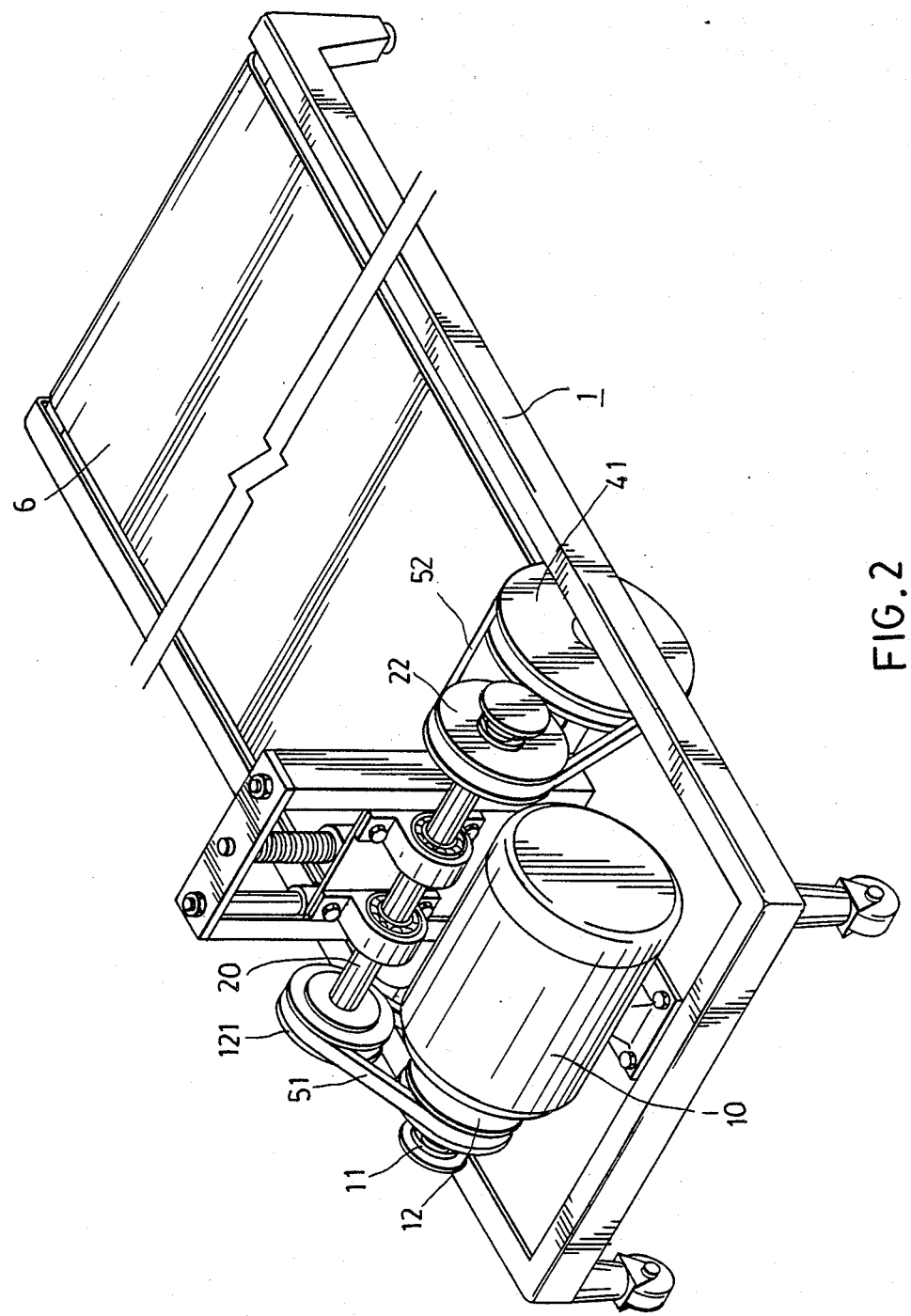
FIG. 2 is a perspective view of the transmission mechanism of FIG. 1.

Referring to FIGS. 1 and 2, a belt transmission mechanism for a tread mill is shown, including a motor 10, an adjustment transmission shaft 20, a guide support assembly 30 for supporting the adjustment shaft 20 in a movable position, and a driven shaft 40 associated with a rotative belt 6 of the tread mill.

The motor 10 is mounted on a front part of the tread mill 1 and has an output shaft 11 on which is mounted a speed changing pulley 12 which has a pair of cone-shaped discs one of which is slideable to approach or move away from the other, and a spring to urge said one disc toward the other disc. The construction of such a pulley is known and will not be detailed herein.

The guide support assembly 30 includes two vertical guide supports 32, each having a rail groove 32a secured to the front part of the tread mill. A holder plate 31 is provided with two lugs 311 at one side thereof. Two opposite ends of the holder plate 31 are received slideably in the guide grooves 32a respectively. The top ends of the guide supports 32 are interconnected by a bar 35, thereby preventing the holder plate 31 from moving out of the grooves 32a. The transmission shaft 20 is inserted rotatably In the lugs 311 of the holder plate 31. A motor 33 is mounted adjacent to the holder plate 31 and is provided with an output shaft 331 which in turn is provided with a worm gear 332. The gear 332 is engaged with another gear 333 mounted on a shaft 336. An opposite end of the shaft 336 is provided with a worm gear 334 which in turn engages with a gear 337 which is mounted on a screw rod 335 which has a screw thread threaded into a sleeve 312 secured to the holder plate 31 at the side opposite to the lugs 311. The screw rod 335 not only can hold the shaft 20 in position but also can move upward or downward the shaft 20 when the motor 33 is operated.

The transmission shaft 20 has a pulley 21 at one end thereof and another pulley 22 at the other and thereof. The pulley 22 is similar in construction to the pulley 12. A V-belt 51 is passed over the pulley 21 and the pulley 12. A second V-belt 52 is passed over the pulley 22 and a pulley 41 is mounted on the driven shaft 40. When the motor 10 is operated, the output motion of the motor will be transmitted to the driven shaft.

Figure 4:
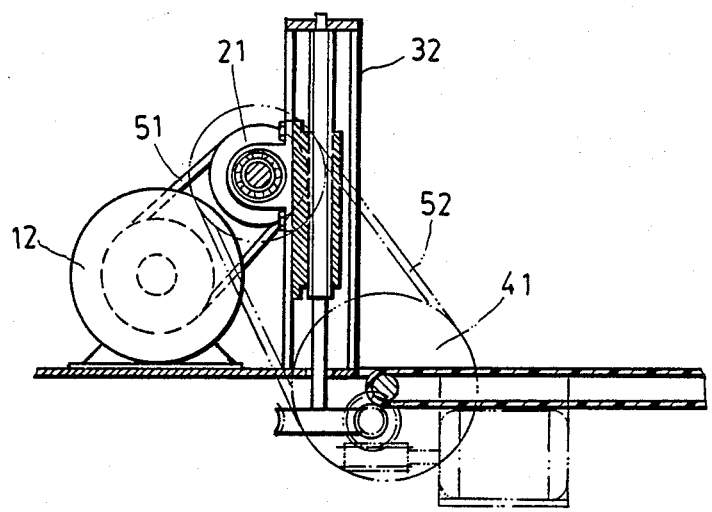
FIG. 4 is an elevation view showing the transmission shaft at the lowest position thereof.
Figure 5:
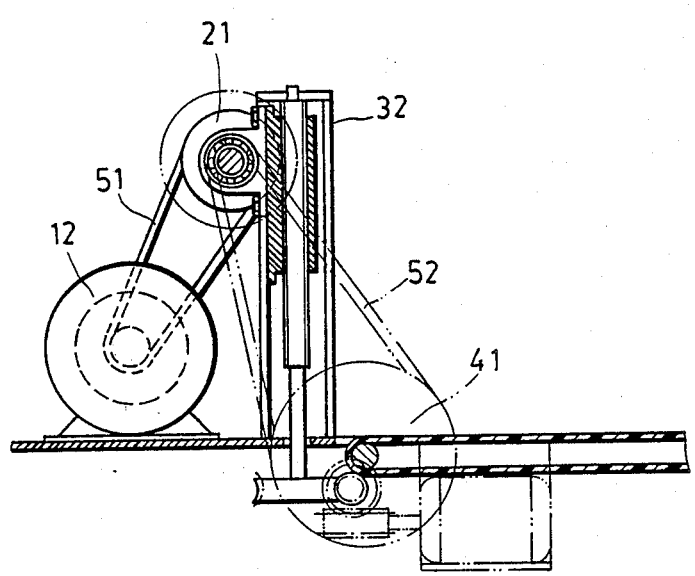
FIG. 5 is an elevation view showing that the transmission shaft is raised.

The motor 33 is a reversible motor. In operation, the user may operate the motor 33 by using a knob (not shown) provided on a control panel (not shown) so as to move upward or downward the holder plate 31 as well as the shaft 20. When the shaft 20 is moved upward as shown in FIG. 5, the distance of the shaft 20 from the output shaft 11 and the driven shaft 40 increase so that the V-belts 51 retract into a deeper position of the pulley 12 and the V-belt 52 retract into a deeper position of the pulley 22. In this situation, the belt 51 reduces the speed of the motion transmitted to the shaft 20 and the belt 52 reduces the the motion transmitted to the driven shaft 40. Conversely, when the shaft 20 is lowered as shown in FIG. 4, the transmission speed will increase. Since both pulleys 12 and 22 effect the function of changing speed, the mechanism of the present invention can achieve a wider range of speed changes than is possible with the conventional speed change mechanism.

The mechanism of this invention further includes a means for limiting the ascent and descent of the shaft 20. This means may include upper limit and lower limit micro-switches or other similar sensing devices.

Figure 3:
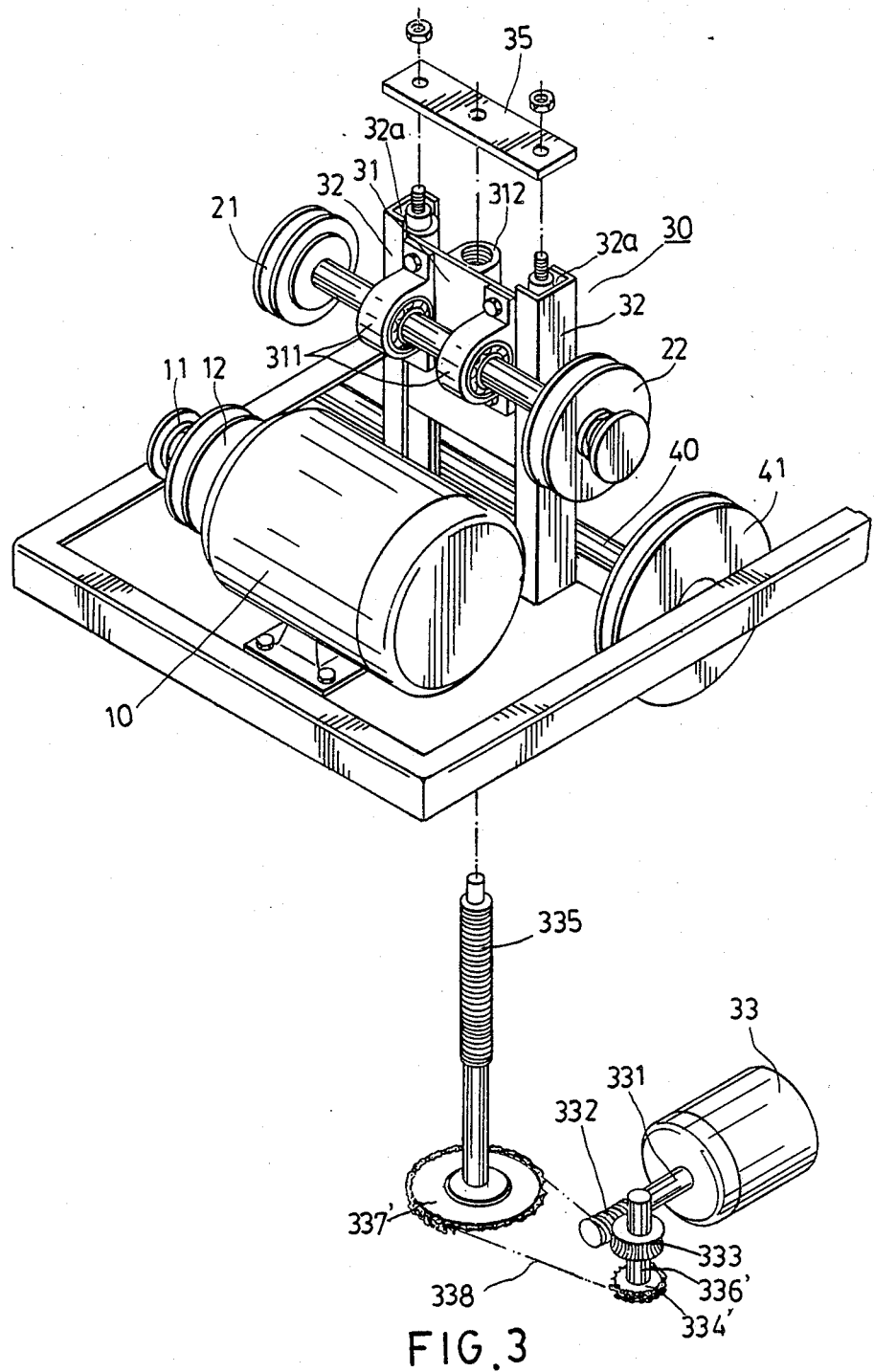
FIG. 3 is an exploded view of a second embodiment of the transmission mechanism according to the present invention.

FIG. 3 shows another embodiment of the invention in which elements similar to those of the first embodiment are represented by similar reference numerals. This embodiment differs from the first embodiment in that the worm gear 332 of the output shaft 331 is engaged with another gear 333 whose shaft 336' has a chain wheel 334', and the chain wheel 334' is connected to another chain wheel 337' through a chain 338. The chain wheel 337' is mounted on the screw rod 335, thereby transmitting the output motion of the motor to the screw rod 335.

With the invention thus explained, it is apparent that numerous modifications and variations can be made without departing from the scope of the present invention. It is therefore intended that the invention be limited only as indicated in the appended claims.

What I claim is:

1. A speed adjusting transmission mechanism for adjusting the speed of a rotative belt of a tread mill which comprises
    a driving motor having an output shaft,
    a driven shaft associated with said rotative belt,
    a transmission shaft provided between said output shaft and said driven shaft,
    a pair of spaced apart vertical guide supports each of which has a vertical rail groove,
    a shaft holding means mounted slideably on said guide supports and carrying said transmission shaft, said means being movable along said rail groove to increase or decrease distances between said transmission shaft and said output and driven shafts,
    a first pulley mounted on said output shaft, said first pulley having two cone-shaped discs one of which is slideable,
    a second pulley mounted on a first end of said transmission shaft,
    a third pulley mounted on a second end of said transmission shaft and having two cone-shaped discs one of which is slideable,
    a fourth pulley mounted on said driven shaft,
    a first V-belt passing over said first pulley and said second pulley,
    a second V-belt passing over said third pulley and said fourth pulley, and
    means for displacing said shaft holding means, thereby to change the distances between said transmission shaft and said output and driven shafts and to position said first and second V-belts more or less deeply into said first and third pulleys,
    whereby said fourth pulley is rotated at slower or faster speeds, respectively, to drive the rotative belt at slower or faster speeds.

2. A speed adjusting transmission mechanism as claimed in claim 1, wherein said shaft holding means is a vertical plate member provided between said vertical guide supports, said plate having two vertical opposite ends respectively received in said rail grooves and a lug means having a hole means receiving said transmission shaft.

3. A speed adjusting transmission mechanism as claimed in claim 1, wherein said means for displacing said shaft holding means includes an adjustment motor, a screw drive means in connection with said shaft holding means, said screw drive means being rotatable about a vertical axis, and means for transmitting the output motion of said adjustment motor to said screw drive means.

4. A speed adjusting transmission mechanism as claimed in claim 3, wherein said means for transmitting the output motion of said adjustment motor further includes means for limiting ascent and descent of said shaft holding means.

5. A speed adjusting transmission mechanism for adjusting the speed of a rotative belt of a tread mill which comprises
    a driving motor having an output shaft,
    a driven shaft associated with said rotative belt,
    a transmission shaft provided between said output shaft and said driven shaft,
    a pair of spaced apart vertical guide supports each of which has a vertical rail groove,
    a shaft holding means mounted slideably on said guide supports and carrying said transmission shaft, said means being movable along said rail groove to increase or decrease distances between said transmission shaft and said output and driven shafts,
    a first pulley mounted on said output shaft,
    a second pulley mounted on a first end of said transmission shaft,
    a third pulley mounted on a second end of said transmission shaft,
    a fourth pulley mounted on said driven shaft,
    a first V-belt passing over said first pulley and said second pulley,
    a second V-belt passing over said third pulley and said fourth pulley,
    at least one of said pulleys having a structure including two cone-shaped discs, one of which is slideable relative to the other, and
    means for displacing said shaft holding means, thereby to change a distance between said transmission shaft and at least one of said output and said driven shaft and to position at least one of said first and second V-belts more or less deeply into at least one of said pulleys,
    whereby said fourth pulley is rotated at slower or faster speeds, to drive the rotative belt at slower or faster speeds.

* * * * *